US005603850A

United States Patent [19]

Holt

[11] Patent Number: 5,603,850

[45] Date of Patent: Feb. 18, 1997

[54] WOOD IMPRINTING METHOD AND APPARATUS

[76] Inventor: Craig S. Holt, 60 Casa Delrey Court, Chico, Calif. 95926

[21] Appl. No.: 447,732

[22] Filed: May 23, 1995

[51] Int. Cl.$^{6}$ .................................................... B23K 11/22

[52] U.S. Cl. ............................................. 219/68; 144/358

[58] Field of Search .................................. 219/68, 69.15; 144/358

[56] References Cited

U.S. PATENT DOCUMENTS

| | | | |
|---|---|---|---|
| 1,146,212 | 7/1915 | Sullivan | 205/693 |
| 1,865,610 | 7/1932 | Blair | 219/384 |
| 2,786,128 | 3/1957 | Lines | 219/69.15 |
| 3,208,846 | 9/1965 | Bruma | 219/69.15 |
| 3,459,915 | 8/1969 | Swazy et al. | 219/69.15 |
| 3,764,767 | 10/1973 | Randolph | 219/618 |
| 4,064,386 | 12/1977 | Numrich, Jr. | 219/68 |
| 4,855,558 | 8/1989 | Ramsbro | 219/69.15 |
| 5,327,951 | 7/1994 | Pickle et al. | 144/358 |

FOREIGN PATENT DOCUMENTS

| | | |
|---|---|---|
| 1965829 | 6/1971 | Germany . |
| 332968 | 7/1972 | U.S.S.R. . |

*Primary Examiner*—Geoffrey S. Evans
*Attorney, Agent, or Firm*—Richard C. Litman

[57] ABSTRACT

Apparatus and method for inscribing wood by the steps treating the wood surface with an electrically conductive preparation, attaching two electrodes to two different regions that have been treated with the electrically conductive preparation and supplying current between the two electrodes over the preparation to inscribe the wood. In one embodiment there is a stationary electrode and a hand held electrode. In a second embodiment there are two movable hand held electrodes used.

15 Claims, 2 Drawing Sheets

WOOD IMPRINTING METHOD AND APPARATUS

BACKGROUND OF THE INVENTION

1. Field of the Invention

The present invention relates generally to wood enhancing methods, and more specifically to imprinting of wood through use of electricity.

2. Description of the Prior Art

Wood is a ubiquitous construction material. It is used in both structural and decorative capacities. Regardless of how wood is used, when wood is exposed to sight, it may have a pleasing appearance or a repugnant appearance, depending on how the wood has been treated. For example, exposed wood on walls is often covered with wall paper. Wooden doors are frequently painted to provide a pleasing appearance. Wooden furniture may be carved, inscribed or embossed to create visual appeal. What is needed is a method that quickly creates an intricate, unusual, attractive wood surface, as do the method and apparatus of the present invention. All of the prior techniques, however, require a choice between fast application and a detailed, unique appearance.

U.S. Pat. No. 1,146,212, issued to John P. Sullivan, on Jul. 13, 1915, shows a compound and method for treating lumber. An electrically conductive compound is applied to two ends of a log, electrodes are applied to the ends, and electricity is passed through the log. The method of this patent is intended to break down organic constituents of the log in order to improve processing characteristics. There is no showing of use of electricity to create a surface pattern.

U.S. Pat. No. 1,865,610, issued to Robert S. Blair, on Jul. 5, 1932, shows a device for burning holes in paper. The device has one electrical contact on a pen-like implement and another electrical contact on a base member which supports the paper to be burned. The device of this patent is not intended for use with wood, nor for carving decorative surface patterns.

U.S. Pat. No. 3,764,767, issued to Arthur J. Randolph, on Oct. 9, 1973, shows a method for embossing wood by pressing on it with a heated, patterned wheel. The wheel is heated by electrical induction. The device of this patent does not burn wood by direct use of an electrical current.

U.S. Pat. No. 4,064,386, issued to George R. Numrich, Jr., on Dec. 20, 1977, shows a method of forming tracks in wood by application of electric current through stationary electrodes. The wood can be made more conductive by application of an electrically conductive fluid. The patent shows only use of two stationary electrodes, so that creating multiple branches or pattern members would be excessively time-consuming. There is no showing in this patent of using a movable, hand-held electrode that would speed formation of and increase control over multiple tracks.

U.S. Pat. No. 5,327,951, issued to Clarisse Pickle et al., on Jul. 12, 1994, shows a method including a step of burning a pre-drawn design or in wood with a heated element. There is no showing in this patent of electrically formed tracks.

Soviet Patent Document No. 332968, issued Jul. 5, 1972, shows an electrical implement having a tip. There is no showing in this patent of electrically formed tracks in wood.

German Patent Document No. 1 965 829, issued on Jun. 16, 1971, shows an arc welding implement. There is no showing in this patent of electrically formed tracks in wood.

None of the above inventions and patents, taken either singly or in combination, is seen to describe the instant invention as claimed.

SUMMARY OF THE INVENTION

Accordingly, it is a principal object of the invention to imprint a pattern in wood.

It is another object of the invention to simulate naturally occurring wormy wood in such a way that differences between naturally wormy wood and simulated wormy wood are imperceptible.

It is a further object of the invention to provide speedy creation and ease of variation of electrically imprinted pattern members by providing a hand-held, movable electrode.

Still another object of the invention is to stimulate electrical imprinting by use of a conductive preparation on wood.

It is an object of the invention to provide improved elements and arrangements thereof in an apparatus and method for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

While various characteristics of wood can be modified, the one characteristic that is most frequently modified is the appearance of wood. This characteristic is most frequently subject to modification because it is so important in many capacities in which wood is used, and because it is so easy to change. Yet, one of the most desirable modifications to the appearance of wood, namely giving wood the appearance of wormy wood, has been time consuming and less than fully effective until the conception of the present invention, which provides electrical imprinting of wormy wood appearance, with ease and variability comparable to writing with a pen.

Figure 1:
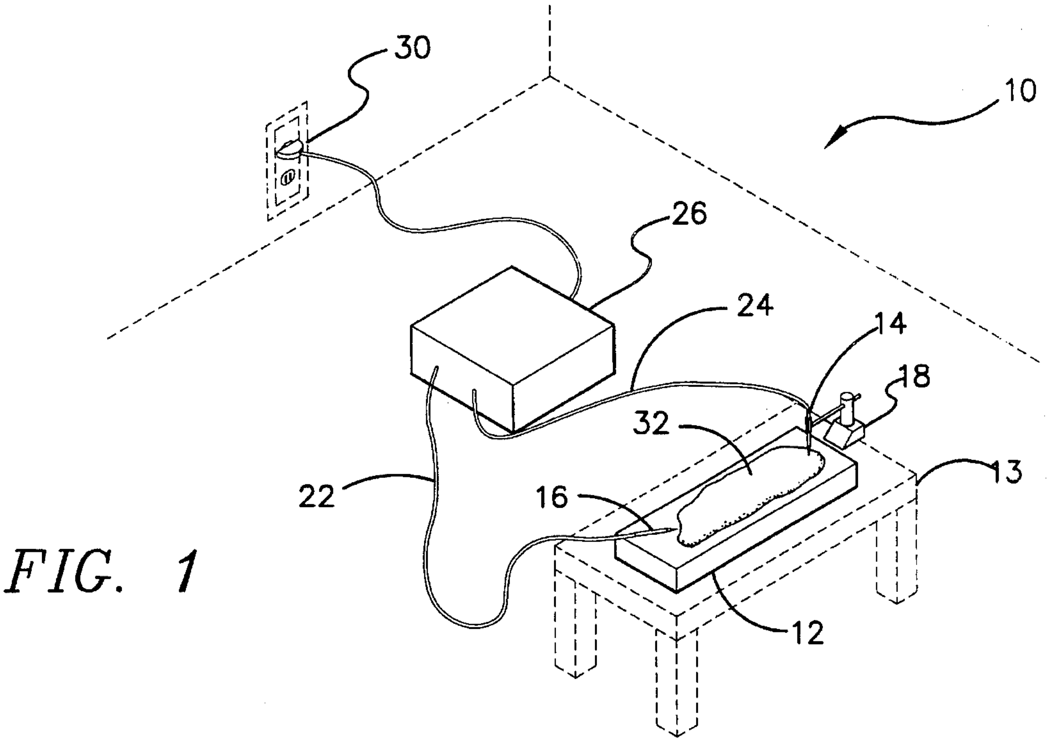
FIG. 1 is an environmental, perspective view of a first embodiment of the present invention.
Figure 2:
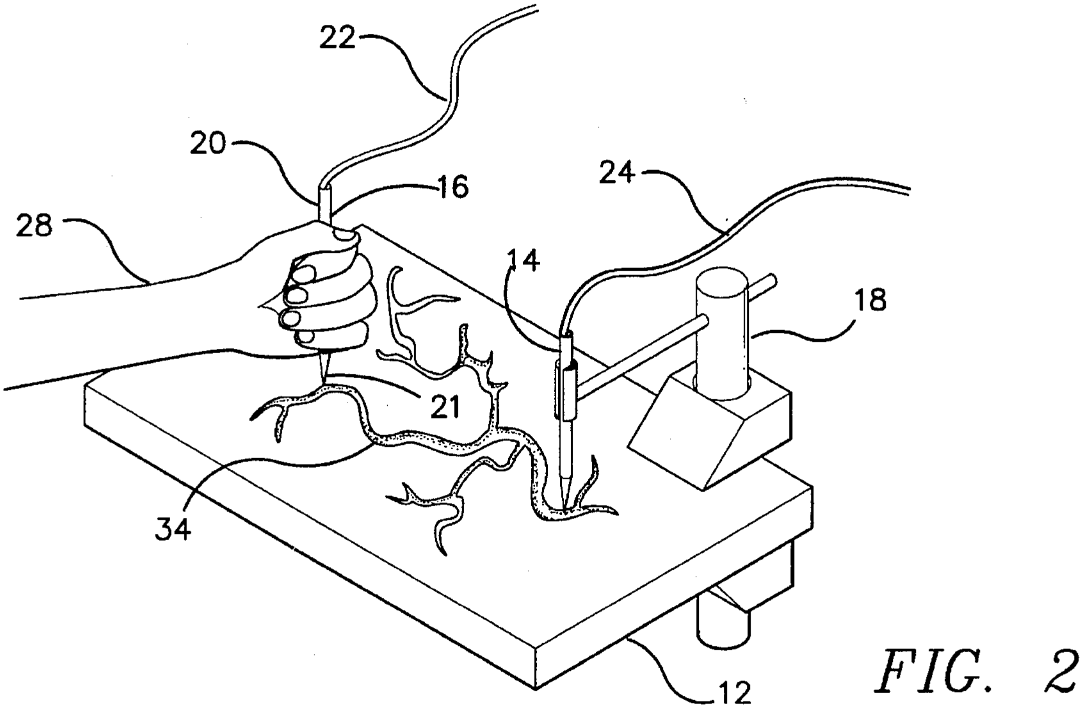
FIG. 2 is a detail, perspective view showing the single hand-held electrode of the first embodiment of the present invention and an exemplary pattern produced by the present invention.

Referring to the drawings, FIGS. 1 and 2 show an apparatus 10 for imprinting wood 12 according to a first embodiment of the present invention. There is a stationary electrode 14 and a movable electrode 16. The electrodes 14, 16 are composed of a known material highly conductive to electricity, such as compounds of silver, gold, and copper. The stationary electrode 14 is releasably mounted by known means to a piece of wood 12 resting on a support 13. Such mounting can be accomplished, for example, by clamping, nailing, or screwing. Clamping with a clamp 18 is preferred, inasmuch as clamping avoids damaging the wood 12. The clamp 18 used for this purpose should be made of an electrically non-conductive material, such as high-density polyethylene.

The movable electrode 16 has insulation that electrically insulates a portion of the movable electrode 16, so as to enable safe and convenient holding in a hand. The insulation 20 may be in the form of a plastic case or other known means for insulating electrical conductors. An uninsulated portion 21 of the movable electrode 16 is applied to the wood 12 to which the stationary electrode 14 is attached, in an area separate from that to which the stationary electrode 14 is attached.

The electrodes 14, 16 are connected by wiring 24, respectively 22, in a known manner, to an electrical source 26. It is desirable that wiring 22 connecting the movable electrode 16 to the electrical source 26 is longer, preferably at least one foot, relative to the wiring 24 connecting the stationary electrode 14 to the electrical source 26. This additional length promotes freedom of movement when moving the movable electrode 16 by hand 28. Typically, the electrical source 26 will receive electricity at a voltage, as from a conventional wall outlet 30 (110 volts or 220 volts, alternating current) and transform the voltage to a constant, Direct Current (DC) voltage by known means, such as a conventional transformer shown in FIG. 1 as the electrical source 26. The non-standard voltage to which the electrical source 26 transforms the voltage is typically around 80 volts, although the voltage could be as high as 100 volts or as low as 60 volts.

Application of the movable electrode 16 to the wood 12 to which the stationary electrode 14 is applied results in completion of an electrical circuit between the two electrodes 14, 16. As is clear to one of ordinary skill in the art, the wood 12 is part of this circuit. Because wood 12 is a relatively poor conductor of electricity little current flows through the wood 12. Yet, because the voltage remains constant, the resistance must also be constant and high (voltage equals current times resistance), despite conduction. High resistance in a conductor generally brings about emission of heat, and in this case, ultimately brings about burning of the conducting wood 12 in a path 34 that electricity flows through it.

Figure 3:
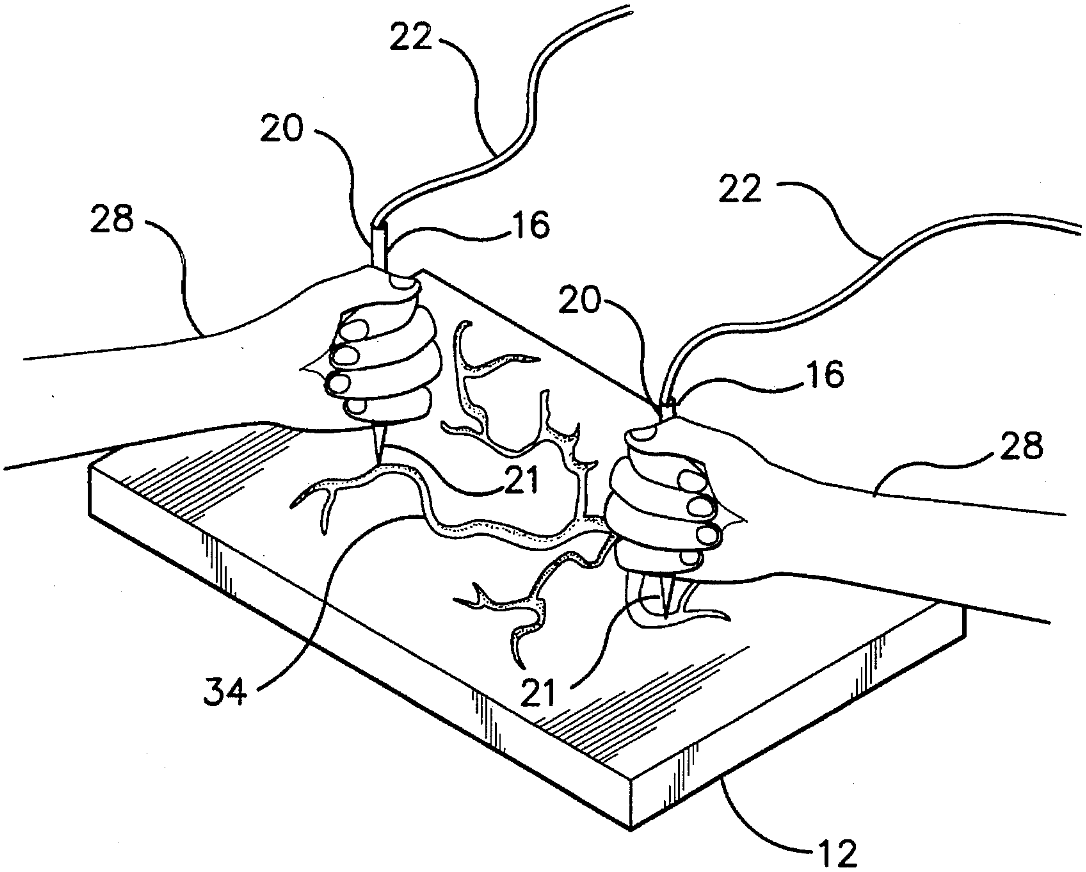
FIG. 3 is a detail, perspective view showing the hand-held electrodes of a second embodiment of the present invention, along with an exemplary pattern produced by the present invention.

A second embodiment of the present invention, shown in FIG. 3, shows the apparatus 10 having two movable electrodes 16, instead of one movable electrode 16 and one stationary electrode 14. This arrangement allows even more control over the imprinting of wood using the apparatus 10. In all other respects, the second embodiment of the present invention is the same as the first embodiment.

A strong advantage of the wood imprinting apparatus 10 of the present invention over prior inventions is the ease with which this burning can be controlled. While electrical burning could be varied in the past by time-consuming removal and replacement of stationary electrodes, the present invention allows for instantaneous variation of a path of electricity through a piece of wood 12. The ease of bringing about this variation enables more effective artistic expression, and a more desirable end-result, namely, a piece of wood 12 that more accurately reflects the user's intentions, as compared to wood modified by prior techniques.

A method of using the apparatus of the first embodiments includes the steps of treating wood 12 with an electrically conductive preparation 32, attaching the stationary electrode 14 to one region of the wood 12, and applying a movable electrode 16 to other regions of the wood 12, by hand 28. If using the second embodiment of the invention, both movable electrodes 16 would be applied, as shown in FIG. 3. The electrically conductive preparation 32 can be any material known to be conductive to electricity and suitable for spreading on a surface of wood. For example, a watery, gelatinous preparation having any of various known metal salts dissolved in it can be used. The preparation 32 is applied to any and all areas of a piece of wood 12 where a user desires to create imprinted patterns 34. This preparation 32 constitutes another advantage of the wood imprinting method and apparatus 10 of the present invention, specifically, the manner in which electro-conductivity of the wood 12 is enhanced. In contrast to prior inventions in which wood is soaked in water or other material, the conductive preparation 32 used with the apparatus 10 of the present invention allows control over flow of electricity through the wood 12. For instance, if a user desires electricity to flow only in a particular path defining a shape, the conductive preparation 32 is applied only in that path. The stationary electrode 14 is attached in such a way as to contact the preparation 32. The movable electrode 16 is applied to an area of the wood 12 on which the preparation 32 has been applied.

It is to be understood that the present invention is not limited to the embodiments described above, but encompasses any and all embodiments within the scope of the following claims.

I claim:

1. An apparatus for imprinting wood comprises:

a stationary electrode;

a movable electrode dimensioned and configured to be held in a human hand;

an electrically conductive preparation applied on a piece of wood between said stationary electrode and said movable electrode, said stationary electrode and said movable electrode each contacting the piece of wood and said electrically conductive preparation; and an electrical source, said stationary electrode and said movable electrode being connected by wiring to said electrical source, whereby current flows through the wood.

2. The apparatus for imprinting wood according to claim 1, wherein each of said stationary electrode and said movable electrode are compounds of a material selected from the group consisting of silver, gold, and copper.

3. The apparatus for imprinting wood according to claim 1, wherein said stationary electrode is dimensioned and configured to releasably mount to a piece of wood.

4. The apparatus for imprinting wood according to claim 3, wherein said stationary electrode is releasably mounted to the piece of wood by use of an electrically non-conductive clamp.

5. The apparatus for imprinting wood according to claim 1, wherein said movable electrode has insulation that insulates a portion of said movable electrode from electrical conduction.

6. The apparatus for imprinting wood according to claim 5, wherein said insulation is a plastic case.

7. The apparatus for imprinting wood according to claim 1, wherein said wiring connecting said movable electrode to said electrical source is longer than said wiring connecting said stationary electrode by a length of at least one foot.

8. A method for imprinting wood comprising the steps of:

applying an electrically conductive preparation to a piece of wood;

attaching a stationary electrode to one region of the wood; and applying a movable electrode to other regions of the wood, by hand, the stationary electrode and the movable electrode being connected by wiring to an electrical source, whereby completion of an electrical circuit between the stationary electrode, the electrical source, and the movable electrode occurs through the wood, causing imprinting of the wood.

9. The method for imprinting wood according to claim 8, further comprising the step of ensuring that the electrically conductive preparation is applied only to regions of wood in which imprinting of the wood is desired.

10. An apparatus for imprinting wood comprises:

two movable electrodes which are each dimensioned and configured to be held in a human hand;

said movable electrodes being connected by wiring to an electrical source, whereby current flows through the wood; and an electrically conductive preparation applied on a piece of wood between said movable electrodes, said movable electrodes each contacting a piece of wood and said electically conductive preparation to imprint said piece of wood.

11. The apparatus for imprinting wood according to claim 10, wherein said electrodes are compounds of a material selected from the group consisting of silver, gold, and copper.

12. The apparatus for imprinting wood according to claim 10, wherein said movable electrodes have insulation that insulates a portion of each of said movable electrodes from electrical conduction.

13. The apparatus for imprinting wood according to claim 12, wherein said insulation is a plastic case.

14. A method for imprinting wood comprising the steps of:

applying an electrically conductive preparation to a piece of wood; and applying two movable electrodes to separate regions of the wood by separate hands, the the movable electrodes being connected by wiring to an electrical source, whereby completion of an electrical circuit between the electrodes and the applied electrically conductive preparation between the electrodes occurs through the wood, causing imprinting of the wood.

15. The method for imprinting wood according to claim 14, further comprising the step of ensuring that the electrically conductive preparation is applied only to regions of wood in which imprinting of the wood is desired.

* * * * *